No. 11,861. Reissued Oct. 2, 1900.
W. W. LOWREY.
COMBINED BOTTLE STOPPER AND SPRINKLER.
(Application filed July 25, 1900.)
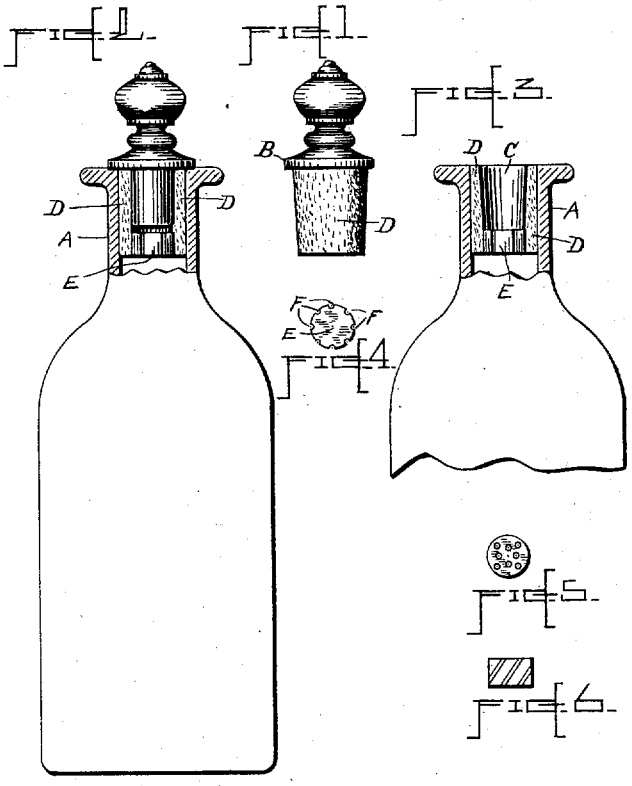
Witnesses:
D. F. Decker
E. L. Lawler.
Inventor
William W. Lowrey
By
H. C. Townsend
Attorney
THE NORRIS PETERS CO., PHOTO-LITHO., WASHINGTON, D. C.

UNITED STATES PATENT OFFICE.

WILLIAM W. LOWREY, OF NEW YORK, N. Y., ASSIGNOR TO THE LOWREY STOPPER AND SPRINKLER COMPANY, OF BALTIMORE, MARYLAND.

COMBINED BOTTLE-STOPPER AND SPRINKLER.

SPECIFICATION forming part of Reissued Letters Patent No. 11,861, dated October 2, 1900.

Original No. 636,821, dated November 14, 1899. Application for reissue filed July 25, 1900. Serial No. 24,836.

*To all whom it may concern:*

Be it known that I, WILLIAM W. LOWREY, a citizen of the United States, residing at New York, in the county of New York and State of New York, have invented a certain new and useful article of manufacture designed to permit the dispensing or ejecting of liquid from the bottle in small or divided quantities.

My invention consists of a bottle-stopper composed of a cork or similar fibrous material combined with vitreous material, such as glass or similar non-corrosive substance, as hereinafter described.

The device consists of a portion termed the "female" portion, which is composed of cork and which, like any cork stopper, is adapted to close the mouth of the bottle. Combined with this female portion is a male portion adapted to engage with the female portion and close the opening through the same at its outer or top end, and a piece of glass or similar material notched or perforated in such manner as to operate preferably as a sprinkler, which is inserted into and partially closes the central opening through the cork at its inner or lower end.

Figure 1 shows the device in elevation detached from the bottle. Fig. 2 is a vertical section of the neck and mouth of the bottle, showing the device in position. The female portion is shown in section, while the male portion and the glass disk or perforated piece are shown in elevation. Fig. 3 is another sectional view of the neck and mouth of the bottle, showing the female portion or cork stopper and the disk or piece of glass provided with one or more openings in position therein, but with the male portion at the upper end detached. Fig. 4 is a plan view of one form of the glass disk detached. Figs. 5 and 6 are detail views showing modifications in the disposition of the openings or passages through the glass disk.

Similar letters refer to similar parts throughout the drawings, in which—

A represents the neck of a bottle, having adjusted in the mouth thereof the stopper, composed of the male portion B, adapted to engage with the tapering aperture C of the externally-tapering-shaped female portion D, the latter being composed of cork or other suitable fibrous material adapted to close the mouth of the bottle. The male portion B closes the tapering aperture C at its outer end when the device is not in use. At the lower end of the aperture or central perforation C is a piece of glass or similar vitreous material E, which is set into said opening and preferably held therein by the resiliency of the cork or other material. This disk may be of any desired shape, but in this instance is shown as of cylindrical shape. It may be provided with any desired number of passages or openings, each of any desired size, adapted to allow the liquid in the bottle to be ejected through said disk into the aperture or opening C, and thence from the mouth of the latter. The passages or openings provided in the disk are shown in Fig. 4 as consisting of grooves around the edge thereof; but they might consist of perforations, as shown in Fig. 5. In using the device the male portion B is removed and the bottle held in an inverted position, at the same time imparting a jerking motion thereto, which will cause the liquid contained in the bottle to depart therefrom in small drops or quantities, the total quantity ejected being obviously dependent upon the rapidity of the movement and number and size of the passages or openings through the disk or attached piece E at the inner end of the aperture or passage C.

Having thus described my invention, what I claim as new, and desire to secure by Letters Patent, is—

1. As an article of manufacture a bottle-stopper comprising an apertured cork having a removable male portion adapted to close the aperture at its outer end and a disk or piece of vitreous material set in said aperture at its lower or inner end and provided with one or more passages or openings as and for the purpose described.

2. In a new article of manufacture the combination of a female portion having a sprinkler provided with two or more perforations connected therewith and a male portion adapted to engage with said female portion substantially as shown and described.

3. In a new article of manufacture, the combination of an externally-tapering-shaped cork or female portion having a vertically-tapering aperture, the glass sprinkler secured at the base of the latter said sprinkler provided with a series of vertically-arranged grooves on its circumference and the glass stopper or male portion substantially as shown and described.

In testimony whereof I have hereunto set my hand and affixed my seal this 12th day of July, 1900.

WILLIAM W. LOWREY. [L. S.]

In presence of—

J. F. AMES,

M. E. GALVIN.